Jan. 6, 1925.

L. R. STOWE 1,521,912

STOKER

Original Filed May 24, 1919 9 Sheets-Sheet 2

Jan. 6, 1925.

L. R. STOWE

STOKER

Original Filed May 24, 1919    9 Sheets—Sheet 5

1,521,912

Witness:
Harry S. Gaither

Inventor:
Lloyd R. Stowe
by Sheridan, Jones, Sheridan & Smith
Attys.

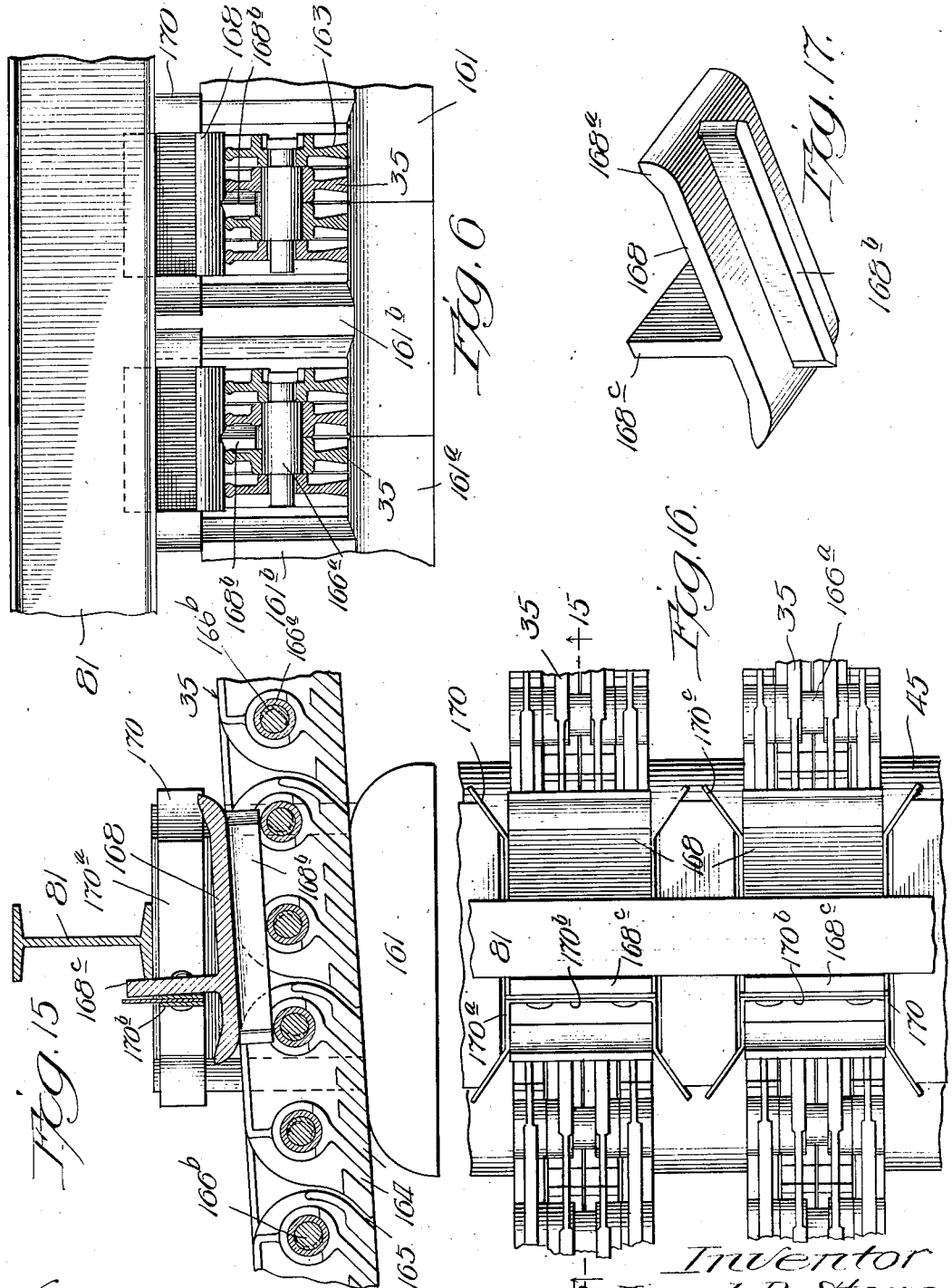

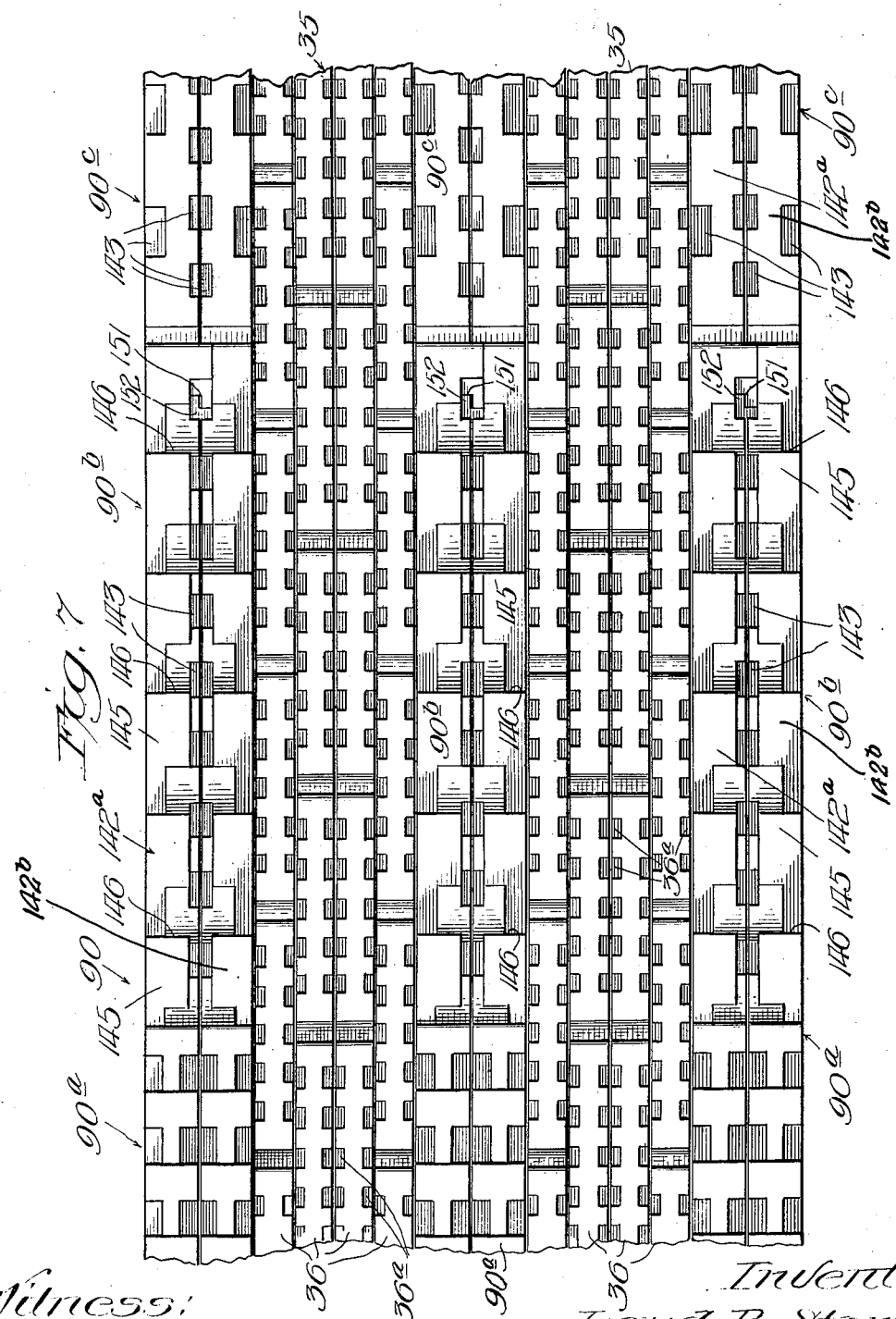

Jan. 6, 1925.
L. R. STOWE
1,521,912
STOKER
Original Filed May 24, 1919    9 Sheets-Sheet 8
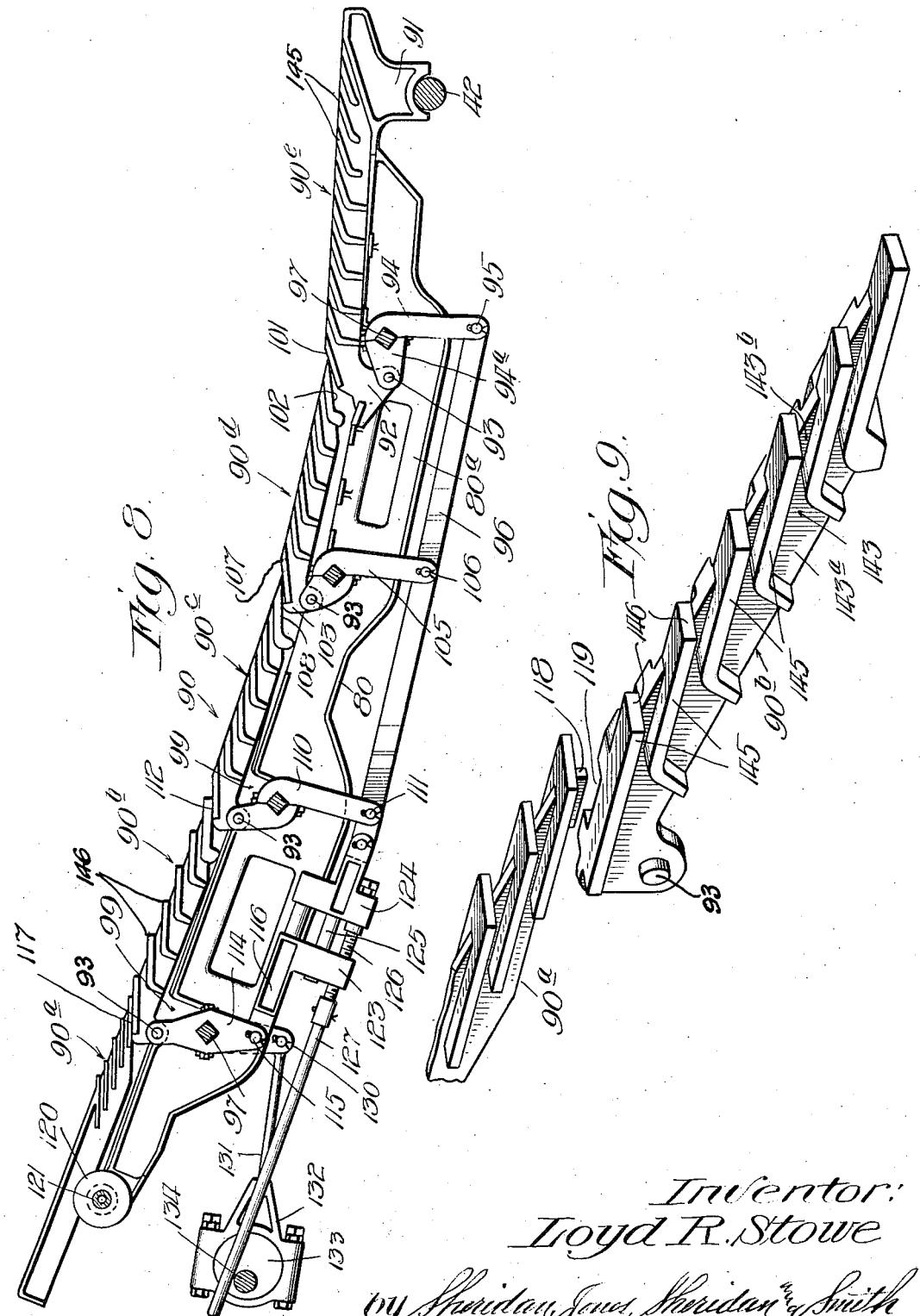
Inventor:
Loyd R. Stowe
by Sheridan, Jones, Sheridan & Smith
Attys Jan. 6, 1925.                                                          1,521,912
                            L. R. STOWE
                              STOKER
                 Original Filed May 24, 1919    9 Sheets-Sheet 9
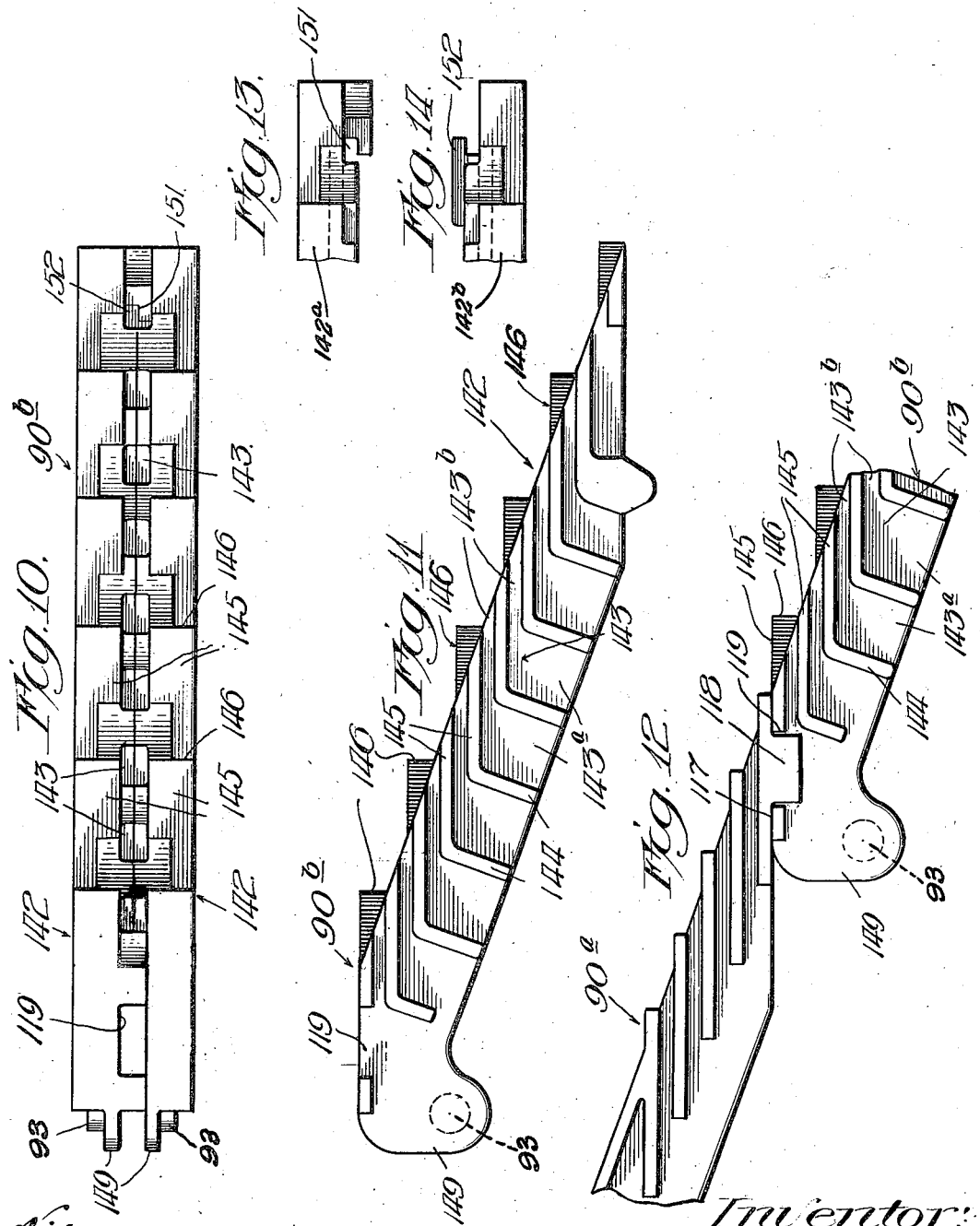

Patented Jan. 6, 1925.

1,521,912

UNITED STATES PATENT OFFICE.

LOYD R. STOWE, OF ST. LOUIS, MISSOURI

STOKER.

Application filed May 24, 1919, Serial No. 299,662. Renewed August 23, 1924.

*To all whom it may concern:*

Be it known that I, LOYD R. STOWE, a citizen of the United States, residing at 5611 Enright Avenue, St. Louis, in the State of Missouri, have invented certain new and useful Improvements in Stokers, of which the following is a specification.

The purpose of this invention is to provide a new form of stoker for use in furnaces and the like for burning fuel by the improved method herein described.

In modern power plant operation it is desirable to secure higher capacities as well as increased economy in the burning of the fuel. The present invention attains this object by completely burning all of the fuel with the least possible supply of air through the provision of means for increasing the rate of introducing air through the fuel bed in conjunction with means for increasing the rate of burning of the coal. While increasing the total supply of air in order to secure greater capacity, the relative supply of air for the coal to be burned can be cut down by causing an increased rate of burning of the coal, thereby decreasing the amount of air for each unit of the coal burned. This high rate of coal burning is brought about with a relatively low air pressure beneath the grate, while at the same time maintaining an automatic and continuous discharge of the ash or refuse from the grate.

In this improved stoker, the ignition arch and the bridge wall are so arranged in relation to the inclination of the grate that the temperature at the charging end of the grate is greatly increased. This high temperature is of great advantage particularly in burning coals of the Pocahontas type, since the initial heating of these coals in the ordinary stroker causes the volatile combustibles to ooze out in the form of a heavy tarry liquid instead of flaring directly into a gas, and this liquid causes the entire fuel bed to become a hot sticky mass which operates to shut off the flow of air from the grate bars and causes the coking of the coal, thereby reducing the temperature of the coke and of the furnace during the coking process, so that after the coking is completed it is impossible to build up the fuel bed temperatures to a point where satisfactory combustion can take place. With this invention, however, the high temperature produced at the charging end of the grate serves to volatilize or gasify the volatile constituents of the fuel as soon as they ooze out in liquid form and before they can do any damage by causing a sticking together of the fuel. The forced draft under the low pressure cooperates with this high temperature to effect an immediate burning of the fuel before any appreciable coking has taken place.

A further important feature of the invention is that it provides means for positively moving the fuel over the grate from the feeding end to the discharge end, while maintaining a uniformly solid and porous condition of the fuel bed from one end of the grate to the other. This improved stoker has the advantage of the ordinary chain grate stoker in that it effects a positive feeding of the fuel throughout the length of the grate and it overcomes the disadvantage of the chain grate stoker by preventing a burning or thinning out of the fuel bed adjacent the discharge end of the grate which ordinarily permits an excessive supply of air to flow through the fuel, thereby interfering with the proper combustion of the coal throughout the area of the grate. These advantages are effected in the present invention by combining the desirable features of the chain grate stoker with means for causing an agitation of the fuel on the grate and for thicking the fuel bed adjacent the discharge end. This is accomplished in the preferred embodiment by employing a plurality of the chain grate elements which are spaced apart to receive sectional grate bars between them, these sectional bars being formed in sections which are capable of movement for the purpose of effecting a gradual retardation of the fuel toward the bridge wall or discharge end of the grate. A further feature of the invention lies in the provision of an inclined grate in which the inclination of the grate surface is decreased near the bridge-wall end in order to effect a retardation of the fuel. A further object of the invention is to provide means for effecting a graduated actuation of the sections of each sectional grate bar, whereby the sections thereof adjacent the upper part of the grate operate in conjunction with the moving chains to permit a relative rapid feeding of the fuel, while at the lower end of the grate the sections of the sectional bars oppose the action of the chains and cause a retardation of the fuel which thickens the fuel bed. The retardation of the fuel at the discharge end operates in conjunction with the faster moving fuel at the upper end of the grate to effect a compression and agitation of the fuel over intermediate parts of the grate surface, thereby breaking up the fuel bed and preventing caking thereof. The invention also provides means for permitting a change in the rate of the feed or in the agitation of the fuel over different parts of the grate surface, either by changing the relative movements of the sections of the bars with respect to the upper surfaces of the moving chains or by changing the relative rates of movement of the sectional bars or the chains. Still another important feature is the provision of means for effecting an independent manual control of the agitation and retardation of the fuel on any desired area of the grate. A further important feature of the invention is the provision of improved means for supporting the sections of the grate construction, whereby the width of the grate may be increased to any desired extent in order to increase the capacity of the stoker. Other objects relate to various features of construction and arrangement which will appear more clearly hereinafter.

The nature of the invention will be understood from the following specification, taken in connection with the accompanying drawings, in which one embodiment is illustrated.

In the drawings—

Fig. 6 is an end elevation of the supporting structure beneath the rear end of the grate, looking toward the left as viewed in Fig. 2, the grate chains being illustrated in transverse section;

Fig. 7 is a top plan view of a portion of the grate surface, showing the apertures for permitting the flow of air to the fuel;

Fig. 8 is a partial longitudinal sectional view, similar to Fig. 2, showing a sectional grate bar after the sections thereof have been actuated and dropped below the grate surface;

Fig. 9 is a perspective view showing the construction of the sections of the sectional bars;

Fig. 10 shows an enlarged top plan view of a section of one of the sectional grate bars;

Fig. 11 shows a side elevation of a section of one of the grate bars;

Fig. 12 is an enlarged side elevation, showing means for connecting two sections of a sectional grate bar;

Fig. 13 is a top plan view, showing means for connecting together the ends of the complementary parts of one section;

Fig. 14 is a plan view of the end of the other complementary link adapted to coact with the part illustrated in Fig. 13;

Fig. 15 shows a longitudinal sectional view through the lower end of the grate on the line 15—15 of Fig. 16;

Fig. 16 is a top plan view of the structure illustrated in Fig. 15; and

Fig. 17 is a perspective view of one of the shoes which ride on the chain.

Figure 1:
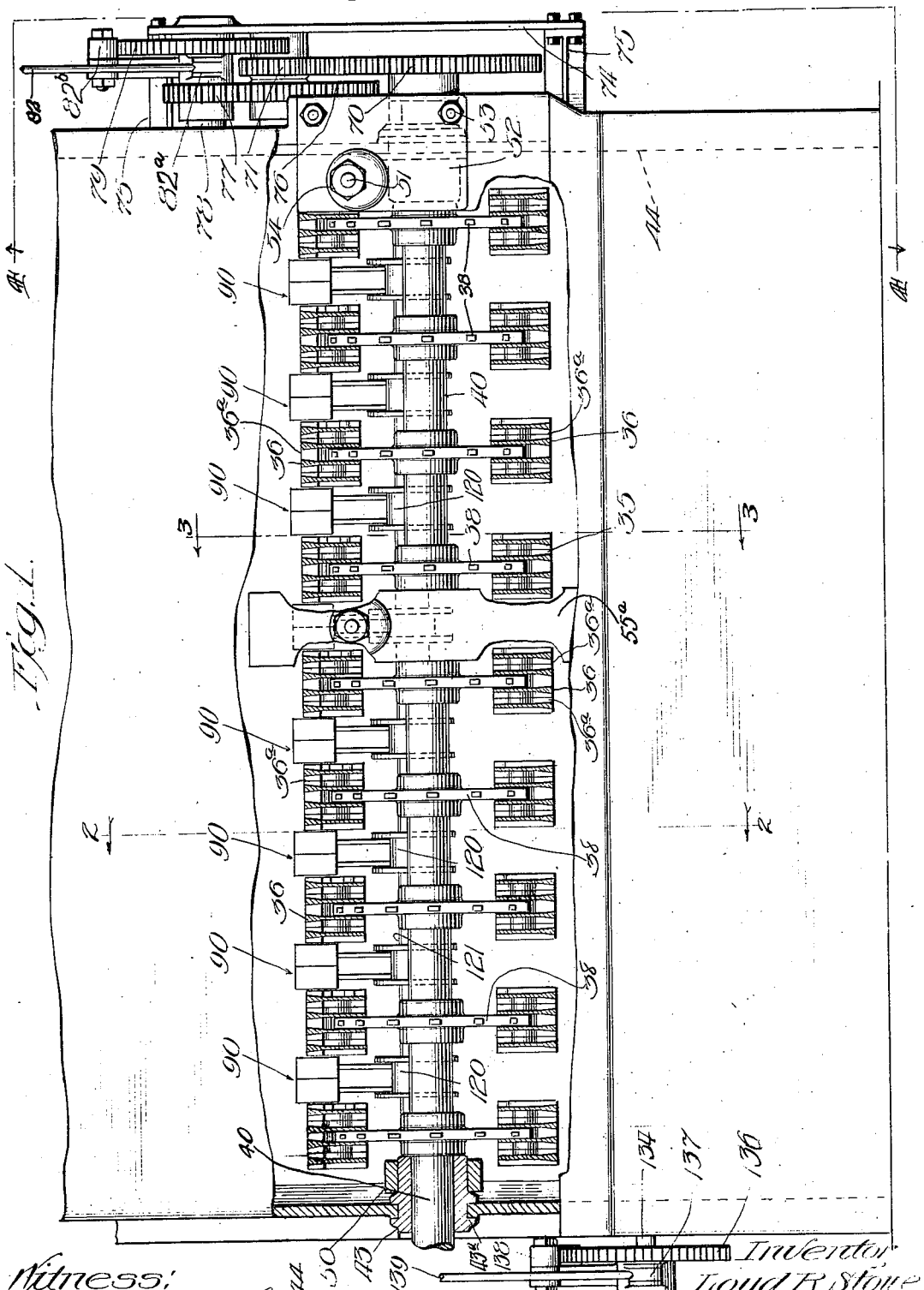
Figure 1 shows an elevation of the front end of the stoker with a portion thereof broken away to illustrate certain parts in transverse section on the line 1—1 of Fig. 2.

The furnace structure comprises a foundation 20, of cement or the like, having a channel 21 therethrough for supplying a draft of air to the grate under pressure, the channel 21 opening at its rear end beneath the grate surface, as illustrated. At the rear end of the lower wall 20ª of the channel 21 an ash pit 22 is provided, and a bridge wall 23, of fire brick or the like, extends vertically from the rear end of the ash pit. Opposite the bridge wall is a fire brick ignition arch 24, which extends outwardly over the forward portion of the grate, which is designated generally by the numeral 25, leaving an opening 26 between the ignition arch and the bridge wall through which the gases and products of combustion pass upwardly over the bridge wall. At the forward end of the ignition arch a fuel hopper 28 is provided, having a vertical rear wall 29 and a forward or lower inclined wall 30, leaving an opening 31, through which the flow of coal onto the upper end of the grate is controlled by a vertically adjustable gate 32. A sheet metal wall 33 closes the forward end of the furnace, and is provided with suitable doors or the like to permit access to the grate and the parts thereof. The grate is thus enclosed in a chamber, so that the air supplied through the channel 21 passes upwardly through the apertures in the grate to the fuel. The grate 25 is mounted at an angle, which preferably approximates the angle of repose, and in practical operation it is found that an inclination of about twenty degrees is satisfactory for the upper and major portion of the grate surface. The ignition arch 24 is hung relatively high above the grate, and this feature, in conjunction with the inclination of the grate, operates to increase the opening beneath the arch and the corresponding projection of the grate surface on the vertical bridge wall. This bridge wall being located in the most active part of the furnace becomes highly luminous on its front face, so that its radiant energy received from the fuel bed and the flame is projected onto the incoming fuel at the upper end of the grate, together with the heat which is reflected by the ignition arch mounted above the grate. This arrangement produces an extremely high fuel bed temperature at the forward end of the stoker, which serves to volatilize the volatile constituents of all coals, so that combustion immediately takes place and the coking of the coal is prevented.

The grate 25 comprises a plurality of endless flexible chains 35, each of which is composed of a plurality of links 36 connected together by pivot pins 37, and having apertures 36ª therethrough to permit the flow of air to the fuel. The chains 35 are preferably constructed so that the length of each chain may be adjusted independently of the other chains in order to secure the same degree of tension in each chain of the grate, one form of such construction of the chain being described and claimed in my copending application, Serial No. 299,661, filed herewith, which has become Patent No. 1,379,135, dated May 24, 1921. The chains 35 are spaced apart as shown in Fig. 1, and are mounted at the upper end of the grate on sprocket gears 38 secured to a transverse shaft 40, while at the lower end of the grate the chains are mounted on idler sprocket gears 41 rotatably mounted on the transverse shaft 42. The chains are driven by the shaft 40 which is journalled in bearings 43 carried by the side frames 44 and by the center frame 55. These side frames are preferably of the form illustrated in Fig. 4, being supported on the wall 20ª of the foundation by the abutment 45 at the rear end of the grate and by the upwardly extending posts or abutments 46 and 47 adjacent the forward end of the grate. The upper edges of these side frames conform substantially to the upper grate surface and at their forward ends they carry the upwardly extending plates 44ª, which form end walls for the coal hopper 28. The bearings 43 are adapted to slide in longitudinal curved slots 49 which are formed in the side frame members, the bearing members being provided with annular flanges 43ª which are adapted to engage opposite surfaces of the side frame along the edges of the slot, as shown in Fig. 1. Collars 50 are extended around the bearing members 43 and are connected to the rods 51 which extend through apertures in the plates 52 secured to the transverse flanges formed on the forward edges of the side frames, by means of bolts 53. The extremities of the rods 51 are threaded and are engaged by nuts 54 which seat against the bosses 52ª of the plates 52, so that the nuts may be tightened to slide the bearings 43 in the slots 49, and thereby adjust the position of the shaft 40 with respect to the shaft 42 at the rear end of the grate in order to regulate the tension of the chains.

Figure 3:
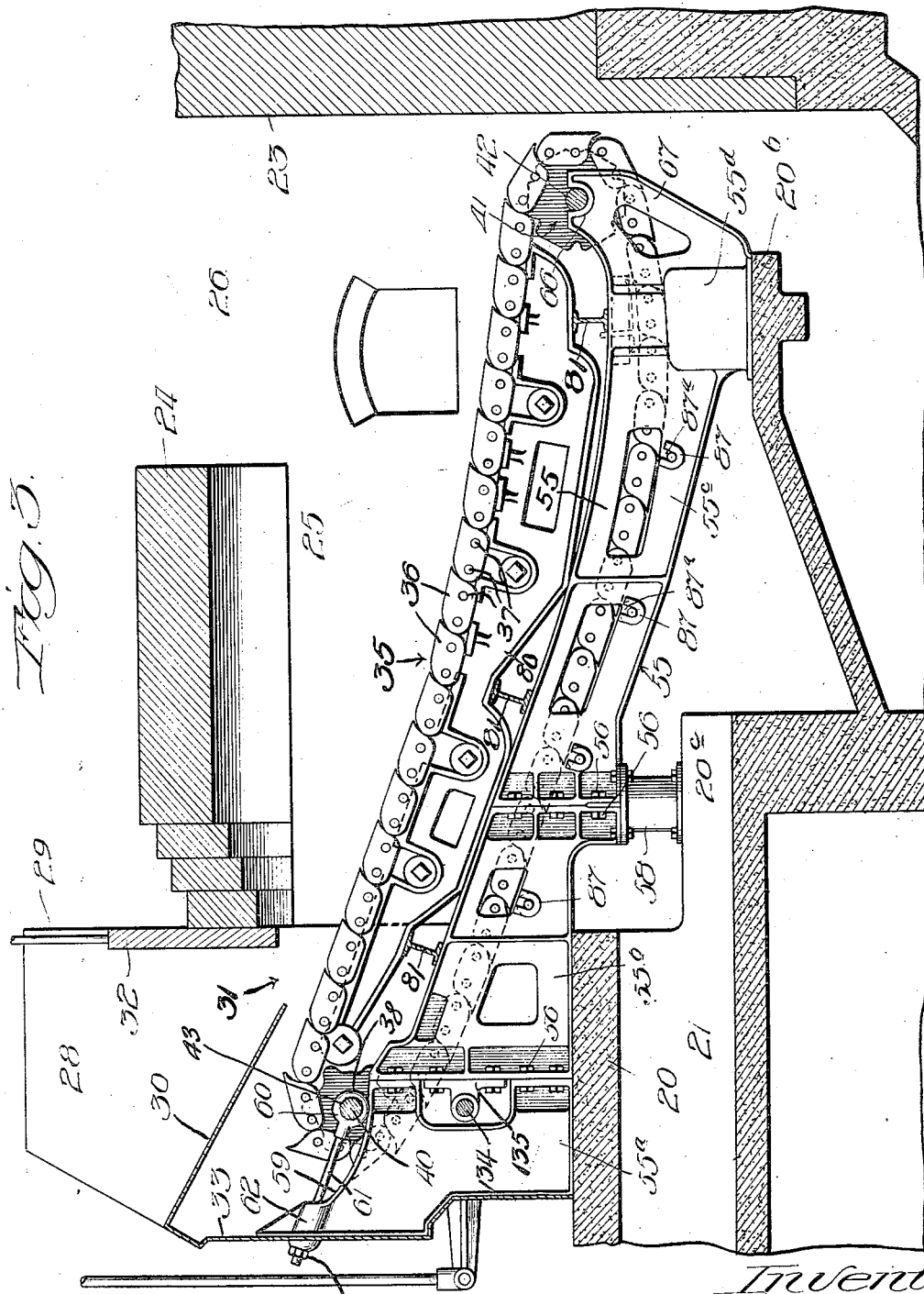
Fig. 3 is a sectional view along the line 3—3 of Fig. 1, the chain grate links being shown in contour for simplicity.

Substantially midway between the lateral edges of the furnace is a center frame 55 which is formed preferably in three parts 55ª, 55ᵇ and 55ᶜ, these parts being provided with transverse coacting flanges through which they are connected together by means of bolts 56. The lower portion 55ᶜ of this center frame is provided with a supporting part 55ᵈ which rests upon the ledge 20ᵇ of the foundation. At an intermediate part the center frame is secured to a vertically extending post 58 which is attached at its lower end to a ledge or abutment 20ᶜ of the foundation, and the forward portion of the center frame is adapted to rest directly on the upper wall of the foundation, as shown in Fig. 3. This center frame extends upwardly between two of the chains 35 and is provided at its forward end with a curved surface 59 adapted to support a bearing member 60 in which the shaft 40 is journalled. The bearing member 60 is connected to a rod 61 which extends through an aperture in the upwardly extending flange 62 carried by the forward end of the center frame and seating against the front wall 33 of the furnace. At its outer end, the rod 61 is engaged by a nut 63, so that the rod 61 may be adjusted simultaneously with the rods 51 in order to move the shaft 40 longitudinally of the grate.

At the rear end of the grate the shaft 42 is journalled in bearings 65 carried by the side frame members, and between its ends this shaft rests in a bearing 66 carried by the upward extension 67 at the lower end of the center frame 55. The shafts 40 and 42 are thus supported between their ends as well as by the side frames, which is a feature of advantage in constructing stokers of great width. This improvement permits grates to be extended to any desired width without causing a downward sagging of the grate between its lateral edges, since any desired number of center frames 55 may be supplied for supporting the shafts and other parts of the grate structure between the side frames.

The projecting end of the shaft 40 has fixed thereon a gear 70 which meshes with a pinion 71 carried by an idler shaft 72 which is journalled in bearings carried by the side frame 44 and by a plate 74 which is spaced outwardly from and secured to the side frame by means of brackets 75. A gear 76 is secured to the shaft 72 at the side of the pinion 71, and this gear 76 meshes with a pinion 77 which is secured to a shaft 78 journalled in bearings carried by the side frame and by the plates 74. A ratchet wheel 79 is rotatably mounted on the shaft 78 and is adapted to be operated by a pawl 82$^b$ pivotally mounted on one arm 82$^d$ of a crank lever 82$^a$. This lever is pivotally mounted on the shaft 78 between the pinion 77 and the ratchet wheel 79, and the outwardly projecting arm 82$^c$ of this lever is connected to an actuating rod 82, which may be reciprocated by any desired mechanism in order to oscillate the lever 82$^a$, and thereby rotate the ratchet wheel 79 and the connecting shaft 40. The slots 49 in the side frames and the arcuate surface 59 on the center frame are concentric with the axis of the shaft 72, so that the shaft 40, upon which the chains are mounted, may be adjusted by the rods 51 and 61 without changing the relative relation of the gear 70 and the driving pinion 71.

Figure 2:
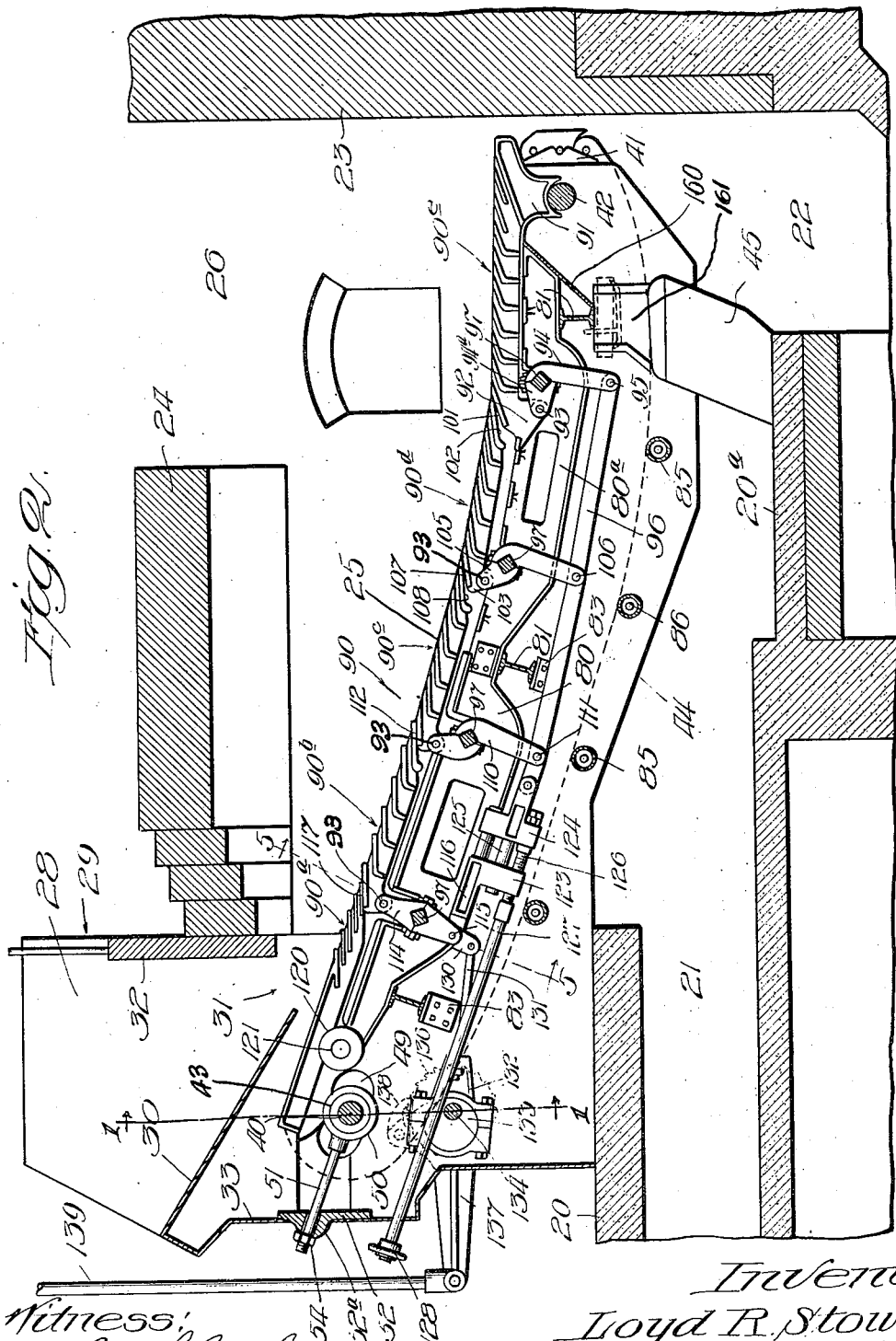
Fig. 2 is a longitudinal sectional view on the line 2—2 of Fig. 1, showing one of the sectional grate bars and the means for actuating the same.
Figure 4:
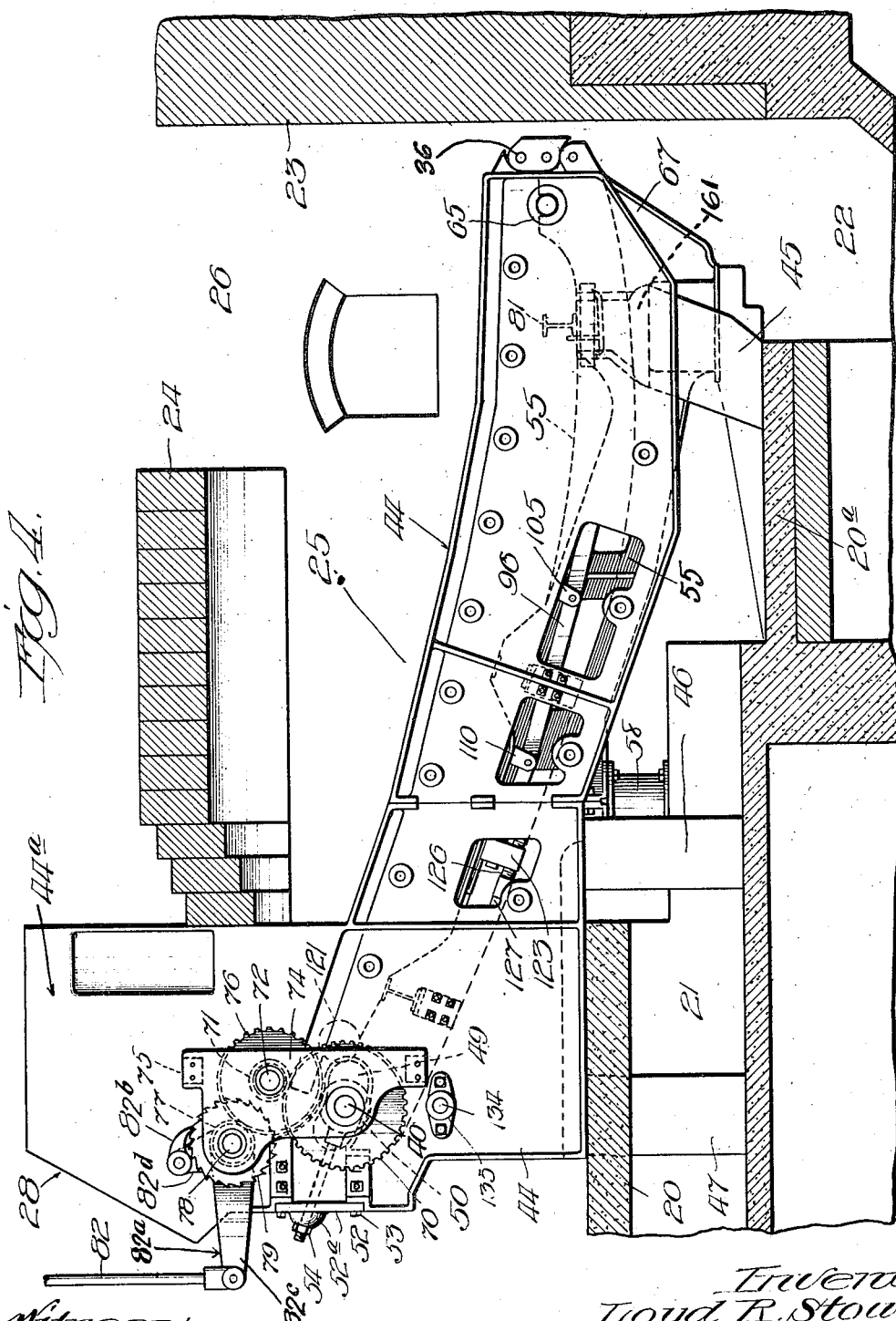
Fig. 4 is a longitudinal sectional view on the line 4—4 of Fig. 1, showing a side elevation of the side frame and the driving mechanism.
Figure 5:
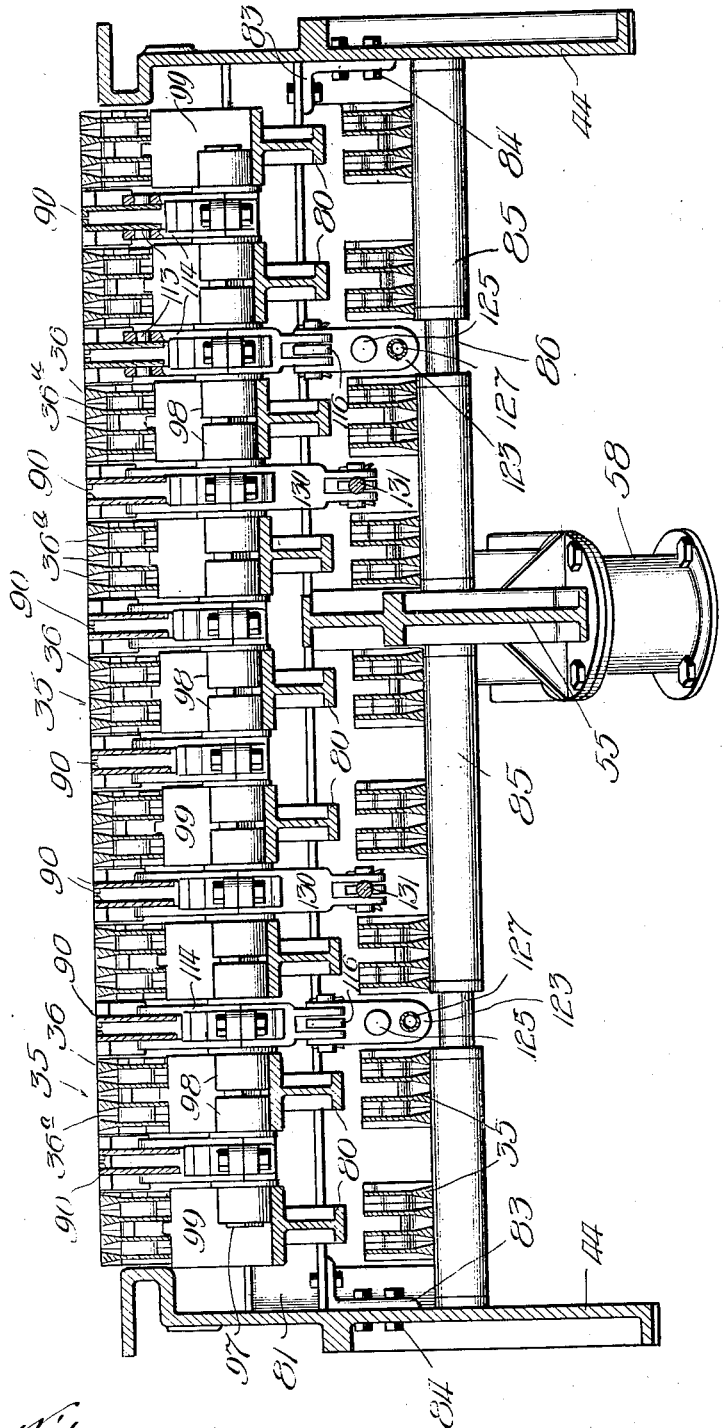
Fig. 5 is a transverse sectional view on the line 5—5 of Fig. 2.

For the purpose of retarding the fuel toward the lower end of the grate, and causing the thickness of the fuel bed to build up adjacent to the bridge wall, the upper surface of the grate is curved upwardly toward its lower end, that is, the lower portion thereof has a smaller incline to the horizontal than the upper part of the grate, as illustrated in Figs. 2, 3, and 4. The side frames 44 are curved to correspond with the curvature of the upper surface of the grate, and the chains 35 are supported by plates or skids 80 which have upper surfaces conforming to the contour of the upper surface of the grate. The chains 35 slide on the upper surfaces of the skids 80, which are preferably I-shaped in cross section, as shown in Fig. 5, the lower flanges of the plates being secured to I-beams 81 which extend transversely of the furnace between the upper and lower strands of the chains and are supported at their ends by the side frames 44 of the furnace, to which they are secured by means of brackets 83 and bolts 84. The skids 80 are increased in vertical depth between the I-beams 81, as shown at 80$^a$ in Fig. 2, and the center frame 55 is constructed to permit these supporting beams to pass over and rest upon the upper surface thereof, as illustrated in Fig. 3. As the chains convey the coal downwardly over the grate surface they are supported by the upper flanges of the skids 80, so that the desired curvature of the upper surface of the grate is maintained, regardless of the load thereon.

In order to give the chains a slight agitation or irregular motion at the lower end thereof, for the purpose of discharging the ash into the pit 22, the sprocket gears 41, which are secured to the lower shaft 42, are preferably non-circular in contour, as shown in Fig. 3. As the links of the chain travel around these sprocket gears the succeeding flat outer surfaces of the gears engage the pivots of the chains and impart vibratory or oscillating movements to the links at the extreme lower end of the grate. After passing around the sprocket gears 41 at the lower end of the grate the links of the chain continue their travel upwardly toward the upper end of the grate, and during this movement they are supported by the tubular rollers 85, which are mounted on rods 86 extending between each of the side frames 44 and the center frame 55, the side frames and the center frame being provided with bosses 87 having vertical slots 87$^a$ therein which permit the rods and rollers to be moved when desired.

The chains 35 are spaced apart, as previously indicated, for the purpose of combining the continuously moving flexible elements with sectional grate bars 90, which are capable of movement for agitating the fuel and controlling the feeding thereof. In the embodiment illustrated, each sectional grate bar 90 comprises five complementary sections 90$^a$, 90$^b$, 90$^c$, 90$^d$, and 90$^e$, which are connected to and coact with each other to form a continuous sectional bar extending throughout the length of the grate. The number of the sections of the sectional bars may be increased or decreased to suit the particular conditions under which the stoker is adapted to operate. The sections 90$^e$ at the lower end of the grate have a lesser inclination to the horizontal than the upper sections of the bars, in order to conform to the upper surfaces of the sectional chains 35, and these lower sections 90$^e$ are provided with downward extensions 91 having curved recesses at their lower ends adapted to seat upon the shaft 42. The upper end of each section 90$^e$ is provided with a downwardly extending flange 92 which is pivotally connected at 93 to an arm 94$^a$ which is secured to the shaft 97. Each of the sectional bars 90$^e$, in the area between the side frame and one of the center frames, or between the center frames where several frames are used, is connected by an arm 94$^a$ to the shaft 97, and one of the arms 94$^a$ is formed as a part of a bell crank lever 94 which has its other arm extending downwardly at substantially a right angle to the arm 94$^a$. The lower arm is pivotally connected at 95 to an actuating bar 96, and the two arms of the lever are clamped on the square portion of the shaft 97 which extends transversely of the furnace and carries a plurality of collars 98 which are adapted to rotate in the U-shaped slots 99 extending downwardly from the upper edges of the skids 80. The upper end of the lower section 90$^e$ is provided with an upwardly and rearwardly inclined surface 101 which is adapted to coact with an inclined surface 102 on the lower side of the lower end of the adjacent section 90$^d$. Each section 90$^d$ is provided at its upper end with a downwardly extending flange 103. These flanges 103 are provided with trunnions 93 which are pivoted to arms which are carried by the shafts 97, and one arm is formed as a part of a bell crank lever 105, the arms of each lever 105 being inclined to each other at a greater angle than the arms of the lever 94. The lower end of the lever 105 is pivoted at 106 to the bar 96. The upper end of the section 90$^d$ and the lower end of the section 90$^c$ are provided with coacting inclined surfaces 107 and 108, respectively, so that the lower end of the bar 90$^c$ is supported by the section 90$^d$. The upper end of each section 90$^c$ is pivoted to an arm carried by a shaft 97, and one of these arms forms a part of a bell crank lever 110, the arms of which are inclined to each other at an angle which is still greater than the angle between the arms of the lever 105. This lever is mounted on a shaft 97, and the lower arm of the lever is pivotally connected at 111 to the actuating bar 96. The next adjacent section 90$^b$ of the bar is supported on the upper end of the section 90$^c$ through coacting inclined surfaces 112, and the upper end of each section 90$^b$ is pivotally connected at 93 to an arm mounted on the shaft 97. One of these arms for each section of the furnace is formed as a part of a lever 114 which is pivotally connected at 115 to an actuating bar 116. The uppermost section 90$^a$ of the sectional bar coacts with the upper extremity of the section 90$^b$ through coacting inclined surfaces 117, and the section 90$^a$ is provided with a downwardly extending tongue 118 which engages a recess 119 in the section 90$^b$, so that the movements of the latter section are imparted to the upper section of the bar. The upper bar is supported in a grooved roller 120, which is mounted on a pivot 121 extending between the upper ends of the adjacent skids 80.

The actuating bars 116 and 96 are provided with transversely extending arms 123 and 124, which are slidably connected to each other by means of the parallel pins 125, which engage apertures in the parallel arms. The arm 124 is pivoted to the bar 96. The arms are threadedly engaged by an adjusting screw 126, which is operated by a rod 127 extending upwardly and through an aperture in the front wall 33 of the furnace. The projecting end of the rod 127 is provided with a handle 128, so that the rod may be operated to change the relative positions of the arms 123 and 124 for the purpose of regulating the initial positions of the levers 94, 105, and 110 with respect to the position of the lever 114. The shafts 97, by which the sections of the sectional bars are operated, do not extend completely across the furnace, but are formed in sections, so that the sections of the grate bars over a part of the area of the grate surface are capable of being controlled independently of the sectional grate bars of the remainder of the grate. In the embodiment illustrated the shafts 97 are formed in two sections transversely of the furnace, so that the area of the grate is divided into two zones, each of which is capable of being independently regulated by one of the two operating rods 127.

The uppermost shaft 97 of each section of the grate is provided with a downwardly extending fixed crank 130, which is connected by a rod 131 to the circular strap 132 which extends around an eccentric 133. This eccentric is fixed on a shaft 134 which extends transversely of the furnace and is journalled in bearings 135 carried by the side frame members 44. A ratchet wheel 136 is fixed on the projecting end of the shaft 134, and a lever 137 is rotatably mounted on the shaft adjacent the ratchet wheel. One arm of the lever carries a pivoted pawl 138 which engages the ratchet wheel, and the other arm of the lever is pivotally connected to a rod 139, which is adapted to be reciprocated by any desired mechanism for oscillating the lever on its pivot and thereby operating the pawl and ratchet. The rotation of the shaft 134 causes a continuous reciprocatory movement of each of the cranks 130 and a corresponding movement of the upper shaft 97 and the connected mechanism. The bars are thus actuated independently of the chains. In some cases, however, it may be desirable to have the upper sections move at the same speed as the chains, or to be held stationary.

The sections of the sectional bars 90 are preferably each formed in two pieces, as shown particularly in Figs 9 to 12. Each section is there shown as comprising two complementary parts, 142$^a$ and 142$^b$, which are fitted together longitudinally and provided with air spaces 143 extending therethrough. These air spaces are preferably directed upwardly, as shown at 143$^a$, and thence horizontally, as shown at 143$^b$, so that the fuel and ash are prevented from falling directly through the bars. The air spaces are formed by the intermediate flanges 144 and 145, and on the upper sections 90$^a$ and 90$^b$ of each bar these flanges are extended outwardly to form steps or shoulders 146, which are adapted to engage the fuel for assisting in the feeding thereof, as hereinafter described. The upper ends of the complementary parts 142 are provided with parallel flanges 149 having oppositely directed trunnions 150 formed thereon to engage apertures in the flanges of the levers 94, 105, 110 and 114, forming the pivotal connections previously described. At their lower ends the complementary parts of the bars are provided with interlocking recesses 151 and lugs 152, so that they are secured together at their lower ends. If desired, these sections of the bars may be formed as integral members.

At the lower end of the grate the passage between the air conduit 21 and the ash-pit 22 is substantially or completely closed in order to prevent the compressed air from flowing upwardly around the lower end of the grate. This improvement is effected by an inclined plate 160 which is secured to the forward ends of the skids 80, being extended downwardly from the under sides of the bars 90 and the chains 35 to the lower rear edge of the lower transverse supporting beam 81, as shown for example, in Fig. 2. The beam 81 rests upon and is secured to a plurality of supporting members 161 which are arranged side by side on the upper surface of the abutment 45 of the foundation. Each casting 161 comprises a base portion 161$^a$ and a centrally located upwardly extending post 161$^b$. The posts 161$^b$ are located beneath the sectional grate bars 90 and support the I-beam 81, leaving spaces between the posts through which the chains 35 are adapted to pass. The chain 35, which is more fully described in my copending application above referred to, comprises four series of links 163 which are spaced apart and provided with upwardly extending grooves 164 in the side faces thereof to permit air to pass upwardly from the air chamber through the grate. These grooves are inclined to the axes of the chains, so that they lie substantially in horizontal planes in the upper stretches of the chains. The end faces of the adjacent links of each series are formed to provide a similar inclined passageway 165, and the links are connected together by pins 166 which engage bushings 166$^a$ extending through the links of the two inner series. The parts 166$^b$ of the pins which engage the bushings 166$^a$ are eccentrically located with respect to the portions of the pins which engage the outer links, so that rotation of the pins will adjust the length of the chain by regulating the relative positions of connected links. The links of the inner series are cut away to receive the sprocket wheels which have teeth engaging the bushings 166$^b$. After the chains pass around the lower end of the grate, they are adapted to slide over the base portions 161$^a$ of the supporting members and the upper sides of the lower stretches of these chains are adapted to coact with floating air seal shoes 168 which are located beneath the I-beam 81. Each air seal shoe 168 comprises a flat plate which is turned upwardly at either end, as shown at 168$^a$, to permit the chain to ride freely thereunder in either direction, and each shoe is further provided with a downwardly extending longitudinal flange 168$^b$, which is adapted to enter and close the space between the inner series of links, which space is adapted to receive the sprocket wheels. A transverse flange 168$^c$ is formed on the upper side of the shoe, and this flange extends upwardly beyond the lower flange of the I-beam 81. A guide frame 170 is mounted above each shoe 168 between the posts 161$^b$, and each guide frame comprises two resilient plates 170$^a$ connected by a transverse arm 170$^b$. The ends of the plates 170$^a$ are inclined, as shown at 170$^c$, to coact with the inclined vertical end faces of the posts 161$^b$, and the flanges 168$^c$ of the shoes are adapted to receive and be attached to the arms 170$^b$. As the chain travels beneath the shoe 168, the shoe rides freely thereon and prevents the passage of air through the central groove of the chain and through the space beneath the lower stretch of chain and the transverse I-beam 81. The construction of the links which ride between the shoes and the plates 161$^a$ prevents the passage of air to any appreciable extent through the chain itself, and thus the entire space beneath the upper stretches of the chains is closed, so that the passage of air from the air chamber around the lower end of the grate is prevented. If in the operation of the stoker any of the links in the chains 35 are broken, the broken parts are liable to rotate about the pins 166, so that the extremities of the broken parts farthest from the pins fall below or rise above the normal boundaries of the upper and lower edges of the chains 35. To permit these broken parts to pass through the apertures between the posts 161$^b$ and between the shoes 168 and the base portions 161$^a$, the shoes 168 may rise to the I-beam 81, thus increasing the opening under the shoe sufficiently to let the broken parts pass. The shoes 168 are held from being pulled away from the I-beam 81 by the resilient plates 170$^a$ which are secured to the parts 168$^c$ and adapted to swing outwardly at 170$^c$ to coact with the posts 161$^b$, so that the shoes are held in position horizontally but are free to rise vertically. In the event of an unusual disturbance, the resilient plates 170$^a$ will yield sufficiently to allow the assembly of the shoes 168 and plates 170 to be completely removed from their positions between the posts 161ᵇ, and it will be found convenient at times during repairs to the chains to thus remove completely the floating shoes 168.

In the operation of the stoker the green coal is fed to the grate from the hopper 28 through the opening 31, which is controlled by the gate 32. Upon striking the upper end of the grate the coal is subjected to an extremely high temperature, due to the fire in the grate and to the radiation of heat by the bridge wall 23 and the ignition arch 24. The volatile constituents of the coal are immediately converted into gases by this high temperature, and the combustion begins before any coking or caking has occurred, this combustion being effected by the forced draft of air which passes upwardly through the apertures in the grate chains and in the sectional bars. As soon as the fuel strikes the grate it is subjected to the feeding action of the chains, which are preferably supplemented at the upper end of the grate by the longitudinal movements of the upper sections of the bars. The actuating mechanism for the sectional bars is preferably operated to move the upper sections of the bars at a faster rate longitudinally than the adjacent stretches of the grate chains are moved, so that the upper recessed sections of the sectional bars are adapted to engage the fuel and move it along over the slower moving chains on the upper portions of the grate. This longitudinal movement of the upper sections of the bars is caused by the movement of the upper shafts 97 which operate the levers 114, and thereby move the sections 90ᵇ and the connected grate bar sections 90ᵃ. As the levers 114 move forwardly at their upper ends, the sections 90ᵇ are moved longitudinally of the grate, and their forward ends ride up on the inclined upper ends of the next lower sections 90ᶜ, so that the sections 90ᵇ have a slight component of the movement into the fuel bed. The next lower sections 90ᶜ are actuated by the levers 110, the arms of which are arranged at a lesser angle to each other than the arms of the lever 114, so that the sections 90ᶜ have a lesser degree of longitudinal movement, but move upwardly to an increased extent into the fuel bed for the purpose of agitating the fuel and retarding the progress thereof due to the feeding chains. The lower inclinded ends of the sections 90ᶜ ride upwardly on the inclined upper ends of the sections 90ᵈ, and these sections 90ᵈ, which are actuated by the levers 105, have a still greater movement into the fuel bed and a lesser longitudinal movement longitudinally of the grate, due to the increased angle between the arms of the actuating levers. The lower ends of the sections of the sectional bars are adapted to ride upwardly and longitudinally on the inclined upper ends of the lower sections 90ᵉ. These lower sections are adapted to pivot around the lower shaft 42, and their upper ends have a still greater movement upwardly into the fuel bed than that of any of the sections located upwardly therefrom. The coal on the grate is therefore subjected to a gradually increasing retarding action as the lower end of the grate is approached. At the upper end of the grate the sections of the sectional bars preferably assist in the feeding of the coal, but as the lower end of the grate is approached, the longitudinal movement of the sections of the bars decreases to zero, and the movement thereof toward or into the fuel bed increases from zero adjacent the upper end of the grate to a maximum in the lower sections of the bars. The movements of the sections of these sectional bars thus serve not only to agitate the fuel, but also to retard the progress of the fuel on the chains, thereby thickening the fuel bed at the lower end of the grate, which is an advantage not possible in any form of stoker heretofore constructed embodying chain grate features. The curvature of the grate, whereby the inclination thereof to the horizontal decreases as the lower end of the grate is approached, also assists in retarding the fuel on the grate and causing a thickening of the fuel bed toward the lower end thereof, where the intensity of the combustion is greatest. The faster feeding of the fuel at the upper part of the grate operates in conjunction with the marked retardation thereof at the lower end to effect a compression of the fuel in the intermediate parts of the grate, so that the entire fuel bed is effectively agitated to prevent caking thereof. The degree of this compression and agitation of the fuel can be regulated by varying the relative speeds of operation of the grate chains and sectional bars, or by adjusting the operating rods 127, in order to regulate the movement of the grate bar sections in different parts of the grate. These grate bar sections drop slightly below the upper surfaces of the grate chains, and are then projected above the grate chains as the eccentrics 133 rotate, and the amount of projection of these sections of the bars above the chains can be regulated as desired by operating the rods 127. Since the grate is formed in sections, any desired one of the rods 127 may be operated to secure an increased or decreased agitation or compression of the fuel in any section of the grate area where the operation appears to be abnormal.

Although I have shown and described a single embodiment of the invention for purposes of illustration, it will be understood that it may be constructed in various other forms without departing from the scope of the invention as defined in the appended claims.

What I claim is:

1. The combination in a stoker of endless moving spaced grate chains, the upper ends of which are inclined downwardly, sectional grate bars located between said chains adjacent the upper surface thereof, and means to actuate the sections of each bar in a movement graduated from substantially longitudinal at the top of the stoker to substantially transverse at the bottom of the stoker.

2. The combination in a stoker of endless moving spaced grate chains, the upper ends of which are inclined downwardly, such inclination varying toward the horizontal from the upper to the lower end of said stoker, sectional grate bars located between said chains adjacent the upper surface thereof, and means to actuate the sections of said grate bars in a movement graduated from substantially longitudinal at the upper portion of said stoker to substantially transverse at the lower portion of said stoker.

3. The combination in a stoker of endless moving spaced grate chains, the upper ends of which are inclined downwardly, such inclination varying toward the horizontal and from the upper to the lower end of said stoker, sectional grate bars inserted between said chains adjacent the upper surface thereof, and means to actuate the sections of said grate bars in a movement graduated from substantially longitudinal at the upper portion of said stoker to substantially transverse at the lower portion of said stoker, the sections of said grate bars being provided with stepped upper surfaces.

4. The combination in a stoker, of a plurality of grate chains spaced apart, a series of sectional grate bars each interposed between two of said chains, means for operating said chains, and means for actuating the sections of said grate bars to produce longitudinal movements thereof adjacent the charging end of said grate and movements thereof into the fuel bed adjacent the discharge end of said grate.

5. The combination in a stoker, of a plurality of grate chains spaced apart, a plurality of sectional grate bars each interposed between two of said chains, said grate bars and said chains being mounted in inclined positions with the lower parts thereof having less inclination to the horizontal than the upper parts thereof, means for actuating said chains to feed the fuel downwardly over said grate, and means for actuating the sections of said grate bars to retard the progress of the fuel toward the lower end of said grate.

6. The combination in a stoker, of a plurality of grate chains spaced apart, means to actuate said chains for feeding fuel, plurality of sectional grate bars each interposed between two of said chains, each of said bars being composed of a series of connected sections, and means for actuating the sections of said bars to effect a rapid movement of fuel adjacent the upper end of said grate and to effect a thickening of the fuel bed adjacent the lower end of said grate.

7. The combination in a stoker, of a plurality of endless spaced grate chains, a plurality of sectional grate bars alternating with said chains at the upper runs thereof, a plurality of actuating means to actuate the sections of the grate bars, both longitudinally and transversely of the grate, each of said actuated means being independently controllable for differential actuation of said bar sections.

8. The combination in a stoker, of a plurality of flexible grate chains spaced apart, means for actuating said chains, a plurality of sectional grate bars each interposed between two of said chains, each of said sectional bars being composed of a series of sections arranged to coact with each other, and means for actuating said grate bars to cause relatively differing movements of the sections of each bar along their contacting surfaces.

9. The combination in a stoker, of a plurality of flexible chains spaced apart, means for actuating said chains, a plurality of sectional grate bars each interposed between two of said chains, each of said sectional bars comprising a plurality of members placed end to end, the adjacent sections of each bar having coacting inclined end surfaces, and means connected to said sections for causing relative movement of adjacent sections along said inclined surfaces and transversely to the travel of said chains.

10. The combination in a stoker of endless spaced grate chains and sectional grate bars alternating with said chains composed of a plurality of complementary sections placed end to end, the adjacent sections of each bar being composed of coacting inclined surfaces, and means for causing longitudinal movements of some of said sections and relative movements of other sections along their inclined surfaces and transversely to the longitudinal axis of said bar.

11. The combination in a stoker, of endless spaced grate chains and sectional grate bars composed of a plurality of complementary sections placed end to end, the adjacent sections of said bars having coacting inclined surfaces, operating levers connected to one end of each of said sections, and means for actuating said levers to cause relative movements of said sections.

12. The combination in a stoker, of a plurality of grate chains spaced apart, a plurality of sectional grate bars each interposed between two of said chains, and sectional grate bars each comprising a series of coacting sections, a series of actuating levers each connected to one of said sections, means for connecting said levers and means for adjusting said connecting means.

13. The combination in a stoker, of a plurality of grate chains spaced apart, a plurality of sectional grate bars each interposed between two of said chains, a plurality of skids extending longitudinally of said chains beneath the upper stretches thereof, a series of operating levers pivotally mounted on said skids and connected to the sections of said sectional grate bars, and means for operating said levers.

14. The combination in a stoker, of a plurality of grate chains spaced apart, a plurality of sectional grate bars each interposed between two of said chains, a plurality of skids extending longitudinally of said chains beneath the upper stretches thereof, a series of operating levers pivotally mounted on said skids and connected to the sections of said sectional grate bars, links connecting the lower ends of said levers and means connected to said links for operating said levers.

15. The combination in a stoker, of a plurality of grate chains spaced apart, means for operating said chains, a plurality of sectional grate bars each interposed between two of said chains, each of said bars being composed of a series of complementary sections, a plurality of skids each supporting the upper stretch of one of said chains, a series of levers mounted between said skids, each of said levers being connected to one of said sections, a plurality of shafts upon which said levers are mounted, bearings carried by said skids for supporting said shafts, and means connected to said levers for actuating the same.

16. The combination in a stoker of a plurality of grate chains spaced apart, a plurality of skids each extending longitudinally of the grate beneath the upper stretch of one of said chains, means for operating said chains, sectional grate bars each interposed between two of said chains, each of said bars being composed of a plurality of complementary sections, a series of levers each mounted between said skids, each of said levers being pivotally connected to one end of one of said sections, the other end of each of said sections being adapted to ride upon the end of the adjacent section, a series of shafts upon which said levers are mounted, said shafts being journalled in bearings carried by said skids, and means for actuating said levers to operate said sections.

17. The combination in a stoker, of a plurality of grate chains spaced apart, a plurality of skids each extending longitudinally of the grate beneath the upper stretch of one of said chains, means for operating said chains, sectional grate bars each interposed between two of said chains, each of said bars being composed of a plurality of complementary sections, a series of levers each mounted between said skids, each of said levers being pivotally connected to one end of one of said sections, the other end of each of said sections being adapted to ride upon the end of the adjacent section, a series of shafts upon which said levers are mounted, said shafts being journalled in bearings carried by said skids, means for actuating said levers to operate said sections, and means for regulating the limits of movement of said sections.

18. The combination in a stoker, of a plurality of grate chains spaced apart, a plurality of skids each extending longitudinally of the grate beneath the upper stretch of one of said chains, means for operating said chains, sectional grate bars each interposed between two of said chains, each of said bars being composed of a plurality of complementary sections, a series of levers each mounted between said skids, each of said levers being pivotally connected to one end of one of said sections, the other end of each of said sections being adapted to ride upon the end of the adjacent section, a series of shafts upon which said levers are mounted, said shafts being journalled in bearings carried by said skids, means for connecting the levers by which the sections of each bar are operated, means for adjusting said connecting means to regulate the relative movements of the sections of each bar, and means for oscillating said levers to actuate said sections.

19. The combination in a stoker, of a plurality of grate chains spaced apart, sectional grate bars each interposed between two of said chains, each of said bars being composed of a plurality of complementary sections, a series of levers each mounted between two of said skids, each of said levers being pivotally connected to one end of one of said sections, the other end of each of said sections being adapted to ride upon the end of the adjacent section, a series of shafts upon which said levers are mounted, a series of links each connecting the lower ends of the levers by which the sections of each bar are operated, means for adjusting said links to vary the relative movements of said levers, and means for oscillating said levers to reciprocate said sections.

20. The combination in a stoker, of a pair of side frames, a plurality of grate chains spaced apart, shafts extending transversely between said side frames, sprocket gears mounted on said shafts and coacting with said chains, grate bars each mounted between two of said chains, a plurality of skids each mounted between the upper and lower strands of one of said chains, transverse beams extending between said side frames and supporting said skids, and a center frame located beneath one of said grate bars and extending upwardly between two of said chains to provide an auxiliary support for said shafts and said transverse beams.

21. The combination in a stoker, of a plurality of grate chains spaced apart, grate bars mounted between said chains, a forced draft chamber beneath said grate, an ash pit adjacent the discharge end of said grate, a supporting wall for said grate, said wall being located between said chamber and said ash pit, a plurality of shoes carried by said wall, said wall having parts extending upwardly between said chains, and a partition carried by said upwardly extending parts and extending transversely of the stoker between the upper and lower stretches of said chains.

22. The combination in a stoker, of a plurality of grate chains spaced apart, grate bars mounted between said chains, a forced draft chamber beneath said grate, an ash pit adjacent the discharge end of said grate, a supporting wall for said grate, said wall being located between said chamber and said ash pit, a plurality of shoes carried by said wall, said wall having parts extending upwardly between said chains, a partition carried by said upwardly extending parts and extending transversely of the stoker between the upper and lower stretches of said chains, said shoes riding on the lower stretches of said chains for preventing the flow of air through the spaces adjacent these chains into said ash pit.

23. The combination in a stoker, of a pair of shafts, sprocket gears mounted on said shafts, flexible chains mounted on said sprocket gears, means for driving one of said shafts, said means comprising a driveshaft and gears, frame members having slots to receive said driven shaft, bearing members slidably mounted in said slots, said slots being concentric with the axis of said driving shaft, and means for adjusting said bearing members in said concentric slots.

24. The combination in a stoker, of a pair of shafts, sprocket gears mounted on said shafts, flexible chains mounted on said sprocket gears and extending between and around said shafts, a driving shaft and gearing to drive one of said first-named shafts, means for adjusting said driven shaft in an arc concentric with said driving shaft for adjusting the tension of said chains.

25. The combination in a stoker of a pair of shafts, sprocket gears mounted on one of said shafts, grate chains mounted on said sprocket gears and extending between and around said shafts, a driving shaft geared to the shaft on which said gears are mounted, bearings for the last named shaft, guides for said bearings, said guides being concentric with said driving shaft, and means for adjusting said bearings in said guides.

26. The combination in a stoker, of a plurality of shafts, sprocket gears mounted on said shafts, flexible grate chains mounted on said sprocket gears, means for actuating one of said shafts, an air chamber beneath said chains, means for enclosing said air chamber at the lateral sides of said chains and at the forward ends thereof, a transverse wall extending between the upper runs of said chains and the lower runs thereof at the rear end of said stoker, air seal members mounted beneath the lower runs of said chains beneath said wall and having apertures therethrough to accommodate the lower runs of said chains, air seal shoes mounted in said air seal members to engage the upper sides of the lower runs of said chains, said chains being cut away on their inner sides to engage said sprocket gears, and flanges mounted on the inner sides of said air shoes to engage the cut away portions of said chains.

In testimony whereof, I have subscribed my name.

LOYD R. STOWE.